United States Patent [19]

Kiunke et al.

[11] Patent Number: 5,485,306
[45] Date of Patent: Jan. 16, 1996

[54] WIDE FIELD OF VIEW MULTI-TELESCOPE OPTICAL MULTIPLEXED SENSOR

[75] Inventors: Paul C. Kiunke, Long Beach; Dean C. Hatfield, Jr.; Reynold S. Kebo, both of Los Angeles, all of Calif.

[73] Assignee: Hughes Aircraft Company, Los Angeles, Calif.

[21] Appl. No.: 976,583

[22] Filed: Nov. 13, 1992

[51] Int. Cl.$^6$ ............................. G02B 23/08; G02B 23/22
[52] U.S. Cl. ............................ 359/419; 359/399; 359/403
[58] Field of Search ............................. 359/362–363, 359/367, 428–430, 399–406, 503–506, 618, 639, 640, 808; 250/201.2, 201.3, 403.6

[56] References Cited

U.S. PATENT DOCUMENTS

| | | | |
|---|---|---|---|
| 4,294,541 | 10/1981 | Abler | 359/405 |
| 4,636,044 | 1/1987 | Loy | 359/402 |
| 4,667,090 | 5/1987 | Carreras et al. | 250/203.6 |
| 4,856,884 | 8/1989 | Fender et al. | 359/618 |
| 4,953,964 | 9/1990 | Anafi et al. | 250/201.2 |
| 4,991,948 | 2/1991 | Hugenell | 359/364 |
| 5,044,738 | 9/1991 | Shaffer | 359/403 |
| 5,108,168 | 4/1992 | Massie et al. | 359/618 |
| 5,113,284 | 5/1992 | Stuhlinger | 359/618 |
| 5,206,499 | 4/1993 | Mantravadi et al. | 359/399 |
| 5,249,080 | 9/1993 | Watson et al. | 359/399 |
| 5,282,087 | 1/1994 | Wickholm et al. | 359/419 |

*Primary Examiner*—Ricky D. Shafer
*Assistant Examiner*—Thong Nguyen
*Attorney, Agent, or Firm*—H. P. Gortler; M. W. Sales; W. K. Denson-Low

[57] ABSTRACT

The optical sensor (10) has a multiple telescope assembly (12), a rotating periscope assembly (14), an imager optical system (16) and a detector (18). The sensor (10) may be utilized with visible, ultraviolet or infrared wavelength radiation. Each telescope (12) views a particular sector of a scene. The rotating periscope (14) multiplexes the output of each telescope (12) to provide a combined wide field of view of each of the sectors. The system may be used in various types of navigation, pilotage, and monitoring systems.

16 Claims, 3 Drawing Sheets

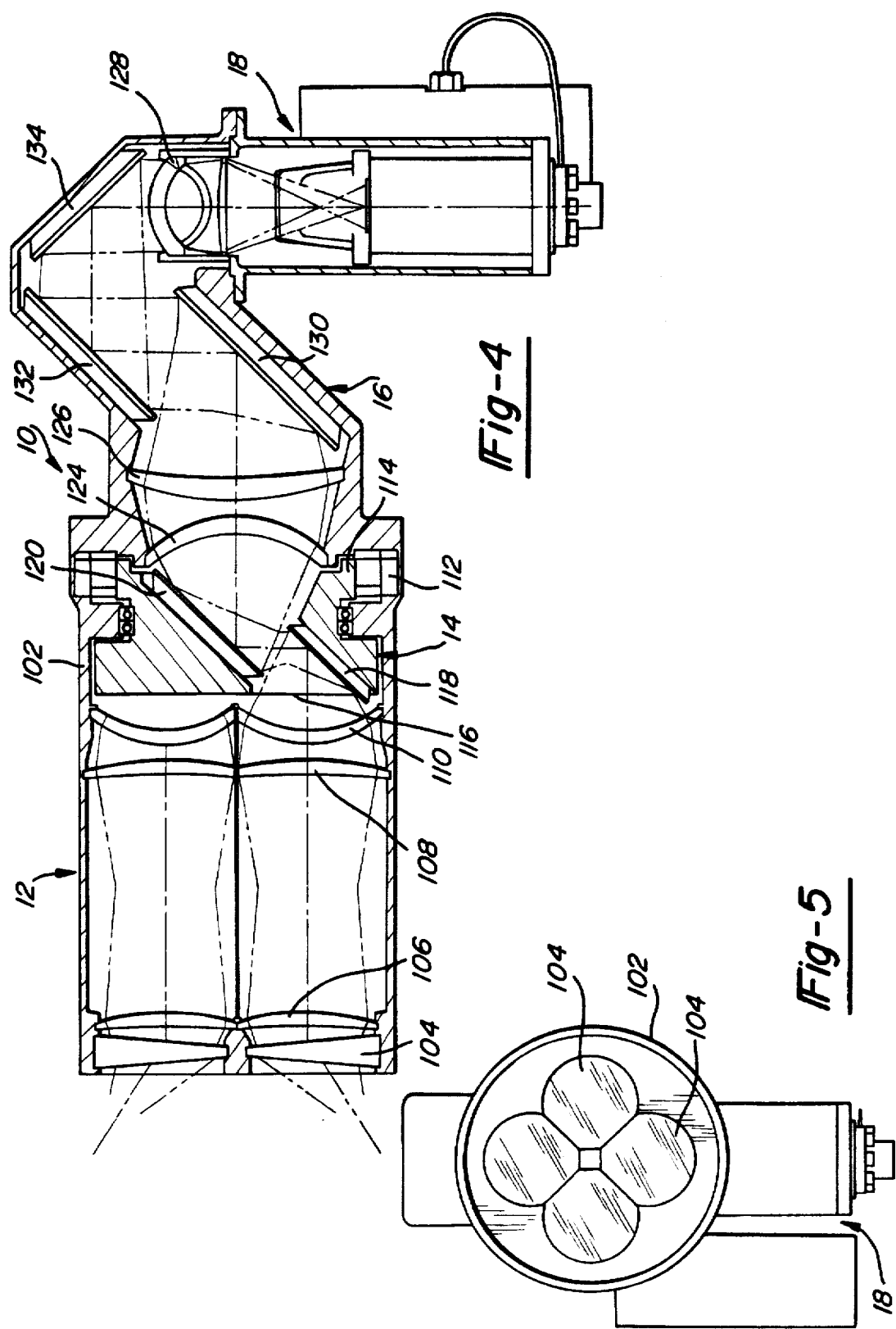

WIDE FIELD OF VIEW MULTI-TELESCOPE OPTICAL MULTIPLEXED SENSOR

BACKGROUND OF THE INVENTION

1. Technical Field

This invention relates to an optical sensor and, more particularly, to a wide field of view multi-telescope optically multiplexed sensor.

2. Discussion

Wide field of view optical systems, such as refractive telescopes, are utilized in multiple spectral applications and in certain space systems. For applications in which navigation, pilotage, or driving of a vehicle are involved, the optical system must provide a large two dimensional field of view. Also, it is desirable to have a wide field of view system which provides a panoramic view or 360° hemispherical coverage view with high image resolution capacity. This type of system may be utilized in wheeled vehicles, such as an automobile, without moving a turret to obtain a full 360° of coverage view. Also, this type of system may be utilized in airborne wide recovery systems and in helicopter, airplane or commercial aircraft collision warning systems.

Previous types of optical systems which were utilized to provide a panoramic wide field of view include wide angle gimbal scan sensor systems and various mirror scan concepts with either fixed sensors or rotating sensors. Disadvantages of these types of systems include a complex gimbal and drive system which is required to perform the wide angle scan function. Another disadvantage is the high acceleration/deceleration associated with turnaround of the gimbal or mirror scan system. Also, angular position of the line of sight in either the gimbal or mirror scan system demands precision installation of a read out transducer on each axis of interest. Further, the window configurations are limited for these scanned systems for wide field of view coverage. The window installation configurations are limited to large windows, faceted windows and spherical windows. These limitations are unacceptable for some types of aircraft installation. Previous wide field of view refractive systems usually have low image resolution.

SUMMARY OF THE INVENTION

According to the teachings of the present invention, a system is provided which has a wide field of view, small window or windows and a minimum number of moving parts. The present invention provides a system with multiple high resolution telescopes linked together by an optical multiplexer which transmits outputs to a detector. This invention uses multiple high resolution telescopes to cover the same field of view usually covered by a single low resolution telescope system. The present invention may be utilized with visible, infrared or ultraviolet spectrums.

The present invention includes an optical multiplexer which is in the form of a rotating periscope (two parallel mirrors at 45° angles). The invention is relatively simple and provides a relatively low cost system and includes a single moving part. The window size problem is addressed by providing small individual windows at or near the pupil of each telescope. Thus, the present invention provides the simplicity of a single moving part and the ability of several small windows to cover a panoramic field of view.

In the preferred embodiment, the wide field of view optical system includes a plurality of high resolution telescopes each positioned to view a sector of a viewed object. Each telescope produces an optical output corresponding to its sector of the viewed object. A common optical multiplexer receives the outputs from each telescope. Imaging optics receive the outputs from the optical multiplexer. A detector receives the outputs from the imaging optics and provides an interpretation of the field of view.

BRIEF DESCRIPTION OF THE DRAWINGS

FIG. 4 is a cross section schematic view of another embodiment of the present invention; and FIG. 5 is a front elevation view of a telescope housing of FIG. 4.

DETAILED DESCRIPTION OF THE PREFERRED EMBODIMENT

Figure 1:
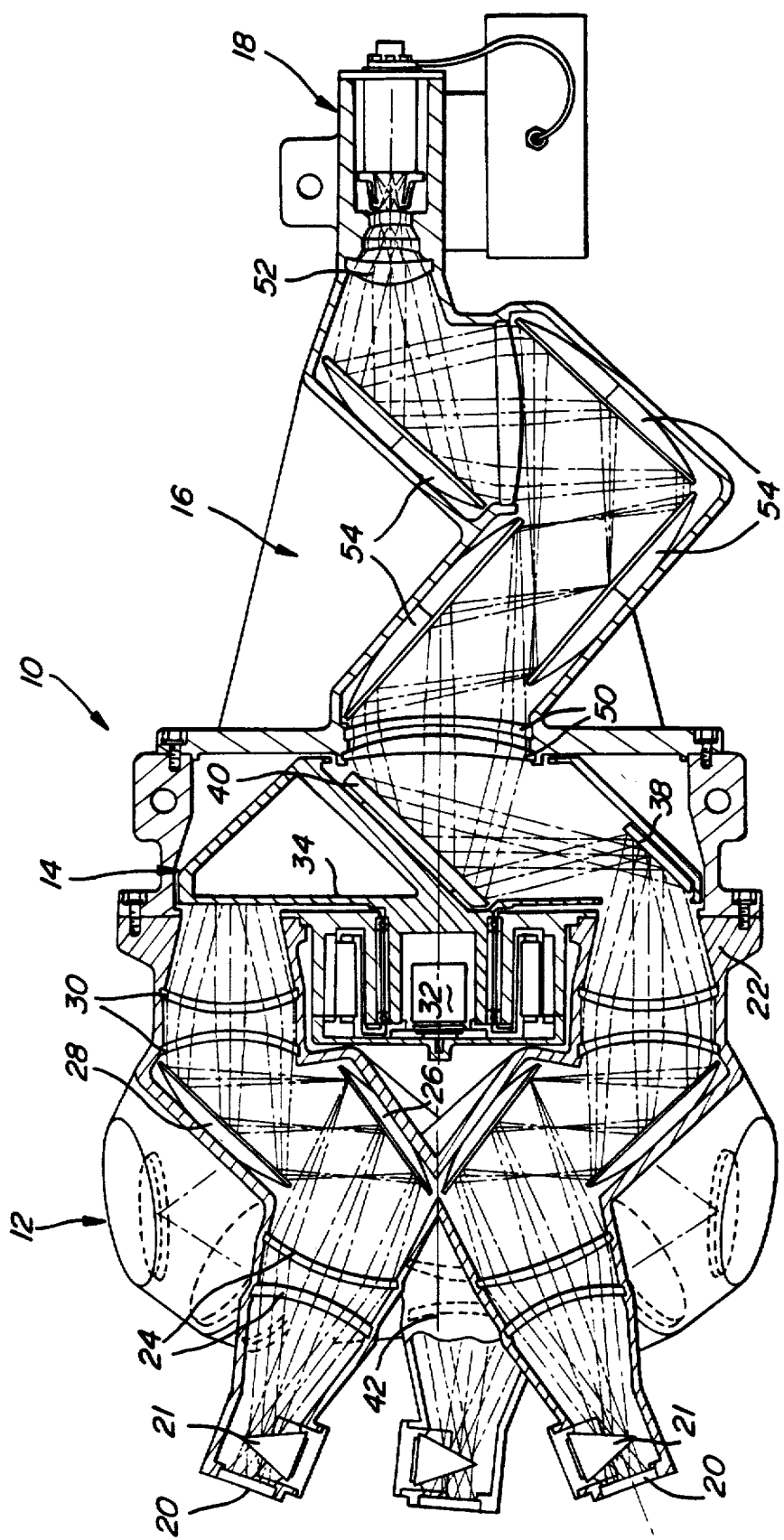
FIG. 1 is a cross section schematic view of an optical system in accordance with the present invention.

Referring to the figures, a multi-telescope optically multiplexed sensor is schematically illustrated and designated with the reference numeral 10. The system includes a plurality of high resolution telescopes 12, a rotating periscope 14, imaging optics 16, and a sensor detector 18. Also, a plurality of windows 20 and delta image orientation or derotation prisms 21 are positioned in front of each telescope. The windows 20 have a relatively small size and are positioned at or near the entrance pupil of each telescope. The delta prisms 21 are used to properly orient the scene image for each telescope system on the detector. Thus, the plurality of windows enables coverage of a large, panoramic or 360° hemispherical field of view.

Generally, the entire optical sensor is positioned within a housing (not shown). The arrangement of the optics, optical folding and the like is dependent upon the particular housing and installation constraints of the intended application. Thus, it should be understood that the present invention may be modified to adapt to various types of systems. Also, the spectral wavelength of the sensor does not impact the concept. The sensor may be used with visible, ultraviolet or infrared radiation with appropriate modifications for the optical system.

Figure 2:
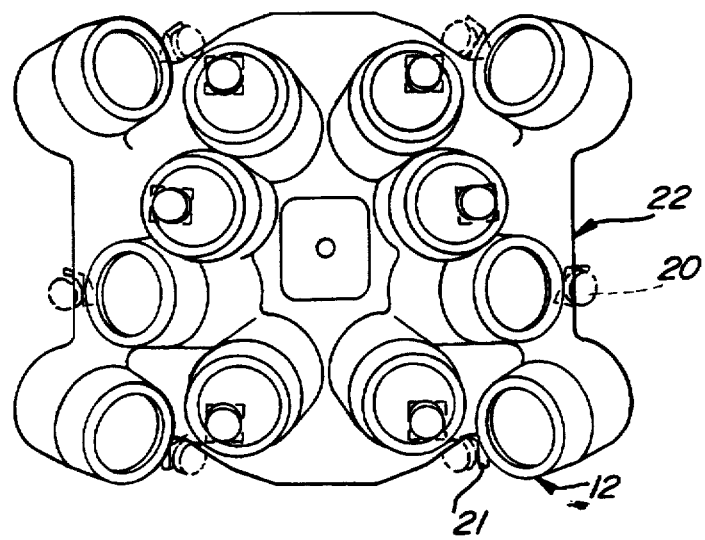
FIG. 2 is a front elevation view of a telescope housing of FIG. 1.

The telescopes 12 are generally positioned within a housing 22 having a desired configuration as seen in FIGS. 1 and 2. The telescopes are fixed and focused on an object to be viewed. Generally, the telescopes include refractive and reflective elements as seen in FIG. 1. Generally, each telescope includes lenses 24, mirrors 26, 28 and a second set of lenses 30. Each telescope receives energy through its window 20 and delta prism 21 and directs the energy to the rotating periscope 14. Each telescope 12 may have the same or a different optical prescription or several of the telescopes may have the same prescription. Each of the telescopes 12 is positioned to view a sector of the field of view.

The entrance pupil end of each telescope 12 may be folded to be directed in any desired direction as best seen in FIG. 2. The alignment of the telescopes at the exit pupil end is compatible with the rotating periscope 14. Each telescope's optical line of sight, relative to the periscope, is parallel to the axis of rotation of the periscope and is the same for all of the telescopes 12. In the illustrated embodiment, there are twelve high resolution telescopes, each pointed to a particular sector of an overall field of view. It should be noted that the particular embodiment illustrates twelve telescopes, however, the invention may be varied from two to greater than twelve, depending on the particular application of the invention. The larger the number of telescopes, the higher the resolution achieved by each telescope system.

The rotating periscope 14 includes a drive motor 32 driving a mirror housing 34. The mirror housing 34 includes an opening 36 and a pair of 45° fold mirrors 38 and 40. The opening 36 enables the energy to enter the periscope 14 from the telescopes 12. The energy is reflected from the first fold mirror 38 to the second fold mirror 40 and then through the imaging optics 16. Generally, the motor 32 rotates at 3600 rpm, which results in a sampling rate of 60 Hertz, so that the periscope acts as a multiplexer which periodically samples the output of each telescope. The mirrors 38 and 40, in the collimated beam, when rotated about the center line of the sensor, enables transfer of optical imagery from the multiple telescopes to the sensor detector 18 without image rotation or defocus. The exit pupil of each telescope is scanned by the periscope in collimated space.

The mirror 40 is mounted on the spin axis 42 of the housing with its reflective surface normal at 45° to the spin axis center line. This positioning directs the imager optical line of sight radially from the spin axis. The reflective surface normal of mirror 38 is mounted to the housing at 45° and displaced radially from the axis such that the imager line of sight will be directed to the telescopes' spatial line of sight.

The imaging optics 16 generally include refractive 50, 52 and reflective 54 elements. The imaging optics 16 may be arranged as desired for a particular sensor. Thus, the beam is folded as it is passed through the imaging optics 16.

The sensor detector 18 may be of a desired type to receive either visible, infrared, ultraviolet radiation or a combination of these spectral bands. Also, the imager optical system 16 may be designed for the particular wave band of interest or for multi-spectral wave bands of interest such as the medium and long wave infrared bands.

Figure 3:
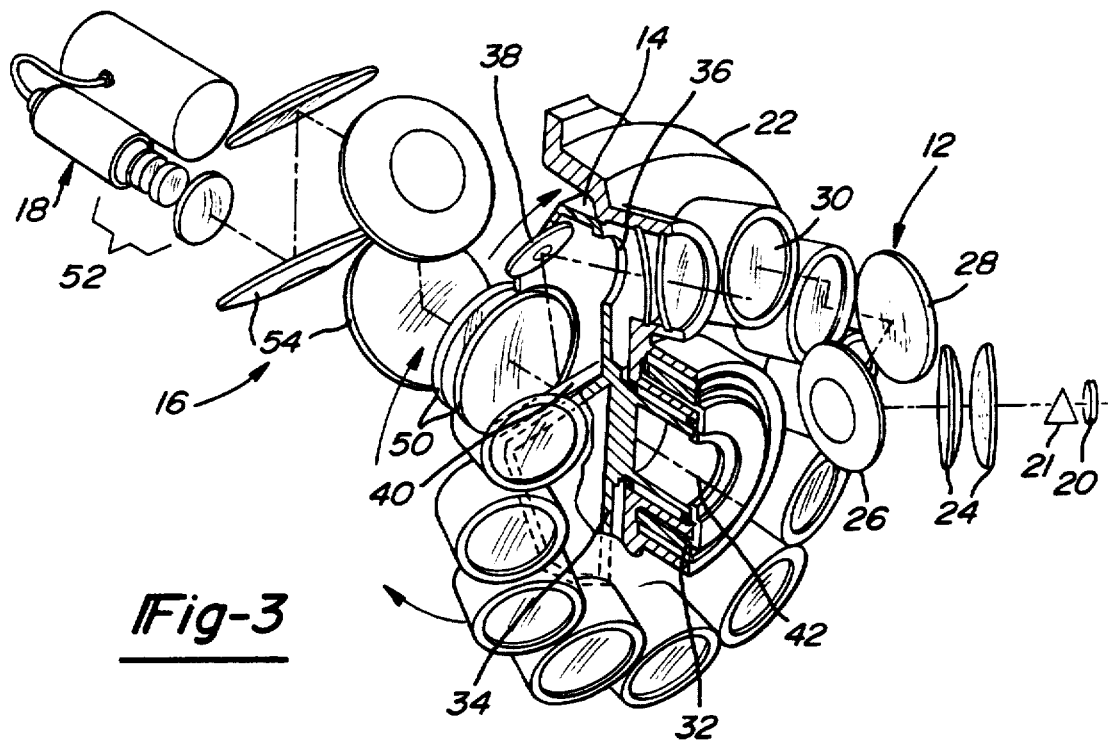
FIG. 3 is a perspective type schematic view of the assembly of FIG. 1.

The particular embodiment illustrated in FIGS. 1 through 3 has a field of view of 57.9° elevation and 102.8° azimuth. The high resolution telescopes are optically linked to the sensor by the rotating periscope 14. The rotating periscope 14 with parallel mirrors 38 and 40 act as a multiplexer, sampling each telescope output and sending the output to the sensor imager optical system and detector 18. The scene viewed by the telescope is three sectors high by four sectors wide, resulting in the 57.9° (elevation) by 102.8° (azimuth) field of view. Each sector is 19.3°×25.7°.

Turning to FIGS. 4 and 5, an additional embodiment of the present invention is shown. The elements which are the same as those previously described will be designated with the same reference numerals.

FIGS. 4 and 5 illustrate a multi-telescope optically multiplex sensor 10 which includes a plurality of high resolution telescopes 12, a rotating periscope 14, imaging optics 16 and a sensor detector 18. The sensor 10 includes a housing 102 housing the telescopes 12, rotating periscope 14 and imaging optics 16 which is connected to the sensor detector 18.

The telescopes 12 are generally positioned within the housing 102. The telescopes 12 are fixed and focused on an object to be viewed. Generally, the telescopes include all refractive elements as seen in FIG. 4. Each of the telescopes include a pointing wedge 104 and lenses 106, 108 and 110. The pointing wedges 104 change the pointing direction of the energy received by the telescope without introducing image rotation into the beam. The pointing wedges 104 also act as the front window of the telescope. Thus, the pointing wedges 104 enable the elimination of the fold mirrors used for pointing the line of sight, the delta image rotation prisms and the windows. The pointing wedges 104 provide a more compact design.

The energy beam is transmitted through the pointing wedges 104 and through the lenses 106, 108 and 110. The alignment of the telescopes at the exit pupil end is compatible with the rotating periscope 14. Each telescope's optical line of sight, relative to the periscope 14, is parallel to the axis of rotation of the periscope and is the same for all the telescopes.

The rotating periscope 14 includes a motor drive 112 driving a mirror housing 114. The mirror housing includes an opening 116 and a pair of 45° fold mirrors 118 and 120. The opening 116 enables the energy to enter the periscope 14 from the telescopes 12. The energy is reflected from the first fold mirror 118 to the second fold mirror 120 and then through the imaging optics 16. Generally, the motor rotates at 3,600 rpm, which results in a sampling rate of 60 hertz. The mirrors 118 and 120, in the collimated beam, when rotated about the center line of the sensor, enables transfer of optical imagery from the multiple telescopes to the sensor detector 18 without image rotation or defocus. The exit pupil of the telescope is scanned by the periscope in collimated space.

The mirror 120 is mounted on the spin axis of the housing with its reflective surface normal at 45° to the spin axis center line. This positioning directs the imager optical line of sight radially from the spin axis. The reflective surface normal of mirror 118 is mounted to the housing at 45° and displaced radially from the axis such that the imager line of sight will be directed to telescope's spatial line of sight.

The imaging optics 16 generally include refractive 124, 126 and 128 and reflective 130, 132 and 134 elements. The imaging optics 16 may be arranged as desired for a particular sensor. The beam is folded as it is passed through the imaging optics.

The sensor detector 18 is the same as that previously described. Thus, the detector may receive visible, infrared, ultraviolet radiation or a combination of these three spectral bands. Also, the imager optical system 16 may be designed for the particular wave band of interest or for multi spectral wave bands of interest such as medium and long wave infrared bands.

The present invention provides a sensor utilizing multiple telescopes and a single detector by means of an optical multiplexer. The invention has use in the visible, ultraviolet and infrared radiation spectrums. The sensor may be used for panoramic sight for tanks or any track or wheeled vehicle, such as an automobile, without moving a turret to obtain a full 360° hemispherical coverage area. The sensor may be utilized as an airborne wide coverage sensor for RPV and helicopter, airplane, commercial aircraft collision warning systems. Also, the system may be effective as a low observable installation in ground, air or sea vehicles. Further, this system would be useful in various types of security monitoring systems.

While the above detailed description describes the preferred embodiment of the present invention, the invention is susceptible to modification, variation, and alteration without deviating from the scope and fair meaning of the subjoined claims.

What is claimed is:

1. An optical sensor comprising:

a plurality of optical means for providing a corresponding plurality of sector outputs from a field of view;

a rotatable periscope assembly for receiving said sector outputs from said plurality of optical means and for providing selected sector outputs; and sensing means for receiving said selected sector outputs from said rotatable periscope assembly, said sensing means interpreting said selected sector outputs and combining said selected sensor outputs to provide an interpretation of the viewed field of view.

2. The sensor according to claim 1 wherein each said optical means includes a telescope.

3. The sensor according to claim 2 wherein said telescopes are in a common housing.

4. The sensor according to claim 1 wherein said sensing means includes an imager optical system and a detector.

5. An optical sensor comprising:

a plurality of telescopes, each positioned to view a sector of a field of view, each said telescope generating an output corresponding to its sector being viewed;

a common multiplexing means for selecting the outputs from said telescopes;

imaging optics for receiving the outputs selected by said multiplexing means, said imaging optics providing an optical imagery of the viewed sectors; and a detector for receiving said optical imagery from said imaging optics, said detector providing an interpretation of said optical imagery.

6. The sensor according to claim 5 wherein said multiplexing means is a rotatable periscope.

7. The sensor according to claim 5 wherein said plurality of telescopes are mounted in a common housing.

8. The sensor according to claim 5 wherein said multiplexing means, imaging optics and detector are positioned within a common housing.

9. The sensor according to claim 5 wherein said plurality of telescopes are different from one another.

10. The sensor according to claim 5 wherein said imaging optics are common to all of said telescopes.

11. The sensor according to claim 5 wherein a plurality of small windows are positioned before said plurality of telescopes for enabling energy to pass into said telescopes.

12. The sensor according to claim 5 wherein a plurality of delta prisms are positioned before said telescopes for transmitting energy to said telescopes.

13. The sensor according to claim 5 wherein each telescope includes a pointing wedge.

14. An optical sensor comprising:

a multiple telescope assembly including a plurality of telescopes mounted in a common housing, each of said telescopes viewing a sector of an object to be viewed to generate a sector output, said sector outputs combining together to form a system field of view;

a rotating periscope assembly for receiving said sector outputs from said multiple telescopes, said periscope assembly optically multiplexing said sector outputs from said telescopes;

an imager optical system for receiving the multiplexed sector outputs from said periscope assembly, said imager optical system imaging said multiplexed sector outputs to provide output energy; and a detector for receiving said output energy from said imager optical system, said detector providing information on said viewed object.

15. The sensor according to claim 14 wherein said periscope assembly, imager optical system and detector are mounted in a common housing.

16. The sensor according to claim 14 wherein said telescope assembly includes twelve telescopes.

* * * * *